No. 821,617. PATENTED MAY 29, 1906.
E. I. DODDS.
CAR BRAKE OPERATING MECHANISM.
APPLICATION FILED SEPT. 18, 1905.
2 SHEETS—SHEET 1.
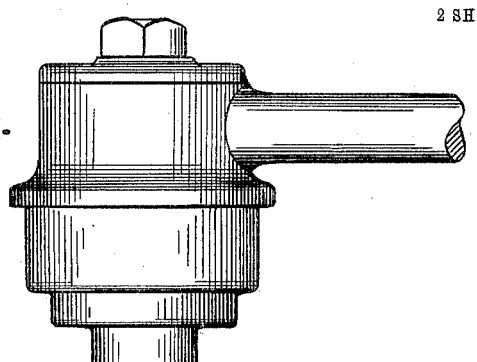
Fig. 1.
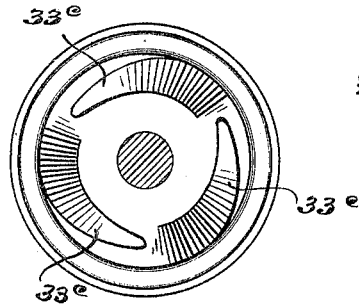
Fig. 6.
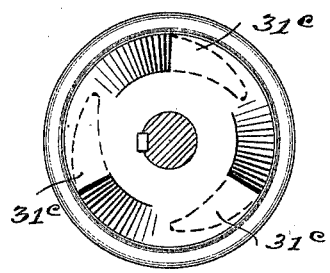
Fig. 7.
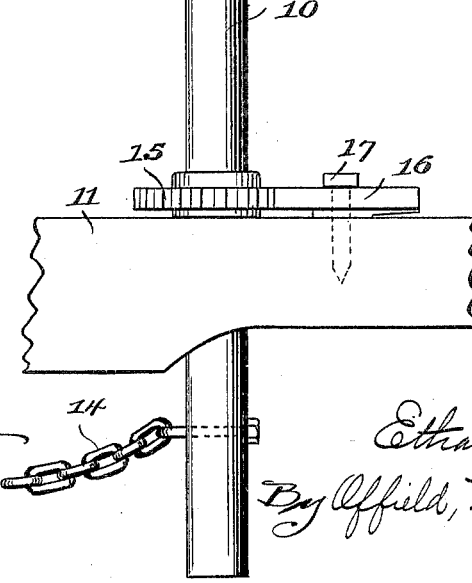
Witnesses,
Inventor,
Ethan I. Dodds
By Offield, Towle & Linthicum
Atty's.

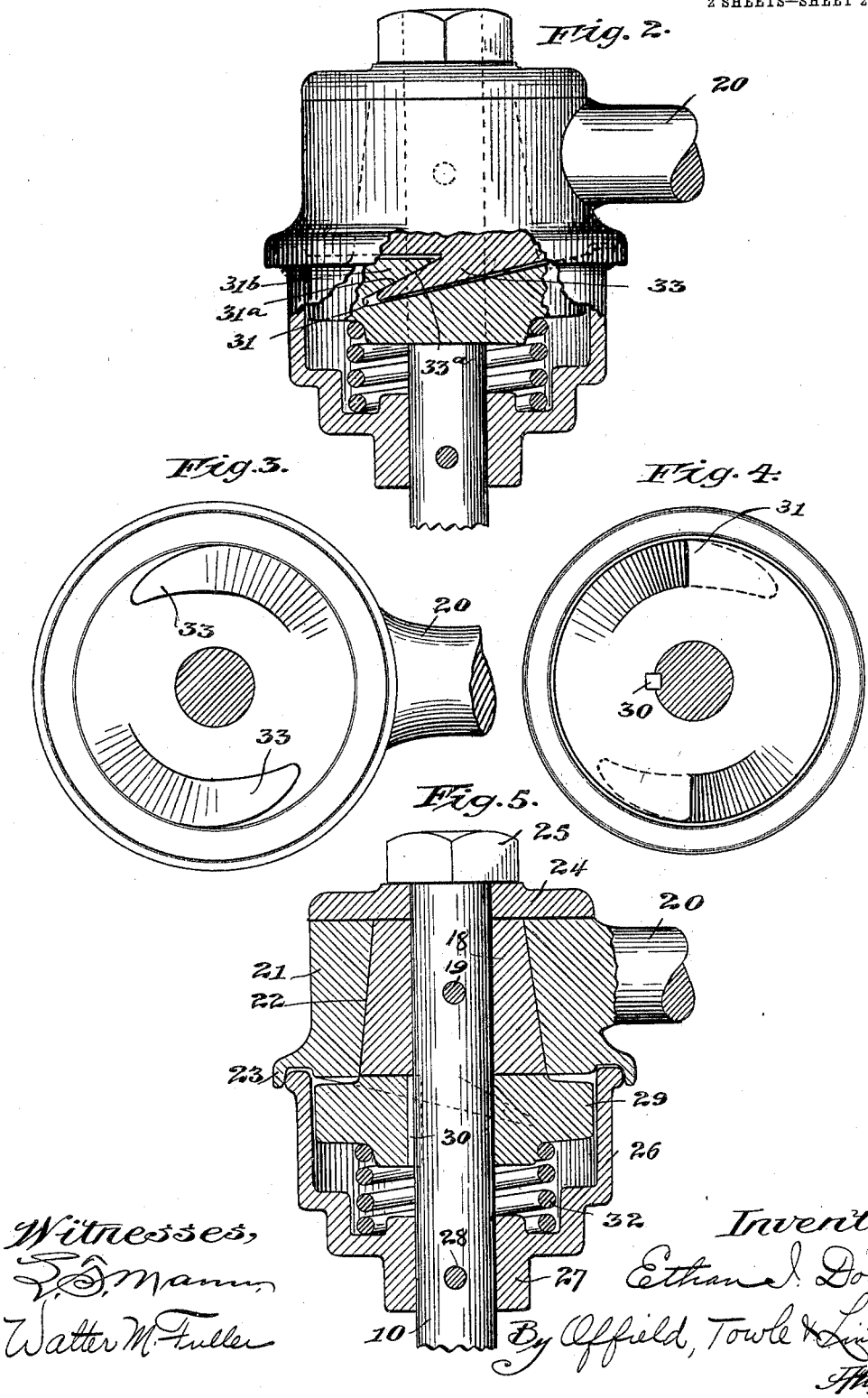

UNITED STATES PATENT OFFICE.

ETHAN I. DODDS, OF PULLMAN, ILLINOIS, ASSIGNOR TO THE PULLMAN COMPANY, OF CHICAGO, ILLINOIS, A CORPORATION OF ILLINOIS.

CAR-BRAKE-OPERATING MECHANISM.

No. 821,617.      Specification of Letters Patent.      Patented May 29, 1906.

Application filed September 18, 1905. Serial No. 278,930.

*To all whom it may concern:*

Be it known that I, ETHAN I. DODDS, a citizen of the United States, residing at Pullman, in the county of Cook and State of Illinois, have invented certain new and useful Improvements in Car-Brake-Operating Mechanisms, of which the following is a specification.

My present invention concerns operating means for car-brakes, and relates particularly to a clutch mechanism for that purpose housed in a casing at the inner end of the actuating-handle. Where such handles and coöperating parts are to be placed in the vestibule of a passenger-car, it is desirable that they have a trim appearance, occupy but small space, and require no oil or other lubricant. My improved device meets these requirements and has other advantages that will be apparent to those skilled in the art.

In the accompanying drawings I have illustrated two embodiments of my invention, like reference characters in all the views referring to the same parts.

Figure 1 is an elevation of my improved brake-actuating mechanism, a portion of the handle being broken off. Fig. 2 is an elevation of the brake-clutch mechanism, parts being broken away to more clearly show the construction. Fig. 3 is a view looking at the under side of the inner end portion of the handle, showing its cam-teeth. Fig. 4 is a plan view of the slidable cam member. Fig. 5 is a central section of the clutch mechanism, and Figs. 6 and 7 are views showing a modification of the cam means actuating the brake-shaft.

The brake-shaft 10 is rotatably mounted in the floor or platform 11 and in a bearing 12, carried by a bracket 13. A brake-shoe-actuating chain 14 is attached to the shaft near its lower end and is adapted to be wrapped around the same to operate the braking means. Just above floor 11 shaft 10 is supplied with a ratchet-wheel 15 and its coöperating pawl or dog 16, pivoted at 17, the pawl and ratchet preventing backward movement of the shaft when chain 14 is being wound around the same. Near its upper end shaft 10 is provided with a conical sleeve or bushing 18, Fig. 5, fastened to the shaft and prevented from turning thereon by pin 19 passing therethrough. Brake-handle 20 has at its enlarged inner end 21 a conical aperture 22, adapted to fit over the collar or bushing 18, the handle also having a depending flange 23 for a purpose to be hereinafter described. To maintain the handle 20 in place, a washer 24 is held against its upper surface by means of nut 25, screwed on the top end of shaft 10. Below the handle a casing or housing 26, having a perforated boss or sleeve 27 fitting the shaft 10, is fastened thereto by a transverse pin 28, extending through the sleeve and shaft, the depending flange 23 of handle 20 overlapping the top edge of casing 26, so as to prevent moisture or other foreign substances from entering. Within the casing is provided a cam member 29, fastened to and prevented from turning on the shaft 10 by key 30, the member being capable of sliding on the shaft and being held in its uppermost position by a coil-spring 32, interposed between casing 26 and member 29. On its upper surface cam member 29 has two oblique recesses 31, whose upper surfaces $31^a$ are inclined, as shown in Fig. 2, the stock above the recesses constituting cam-teeth $31^b$. The under side of the enlarged end 21 of handle 20 is supplied with oblique depending prongs or cam-teeth 33, the upper surface of which, $33^a$, is also inclined. In Figs. 3 and 4 I have shown but two of these recesses 31 and cam-teeth 33; but it will be apparent that any number of the same may be employed, and in Figs. 6 and 7 I have illustrated three of such devices, the prongs being characterized by the reference-numerals $33^c$ and the recesses by the numerals $31^c$.

The operation of the device is as follows: When handle 20 is rotated forwardly or in a clockwise direction, teeth 33 engage the under sides of teeth $31^b$, the two cam-surfaces $33^a$ and $31^a$ coacting to raise the cam member 29, so that its upper surface abuts against the lower surface of bushing 18. Further movement of the handle in the same direction causes the drawing down of the conical surface 22 on the bushing 18, so that an effective frictional engagement is secured between the handle and said bushing, which is pinned to the shaft, whereby the latter is rotated. It will be apparent that the shaft is turned forwardly by the frictional engagement between the handle and bushing and also positively by the forward rotation of the cam member 29 through the action of teeth 33, whose motion is transmitted through cam member 29 and key 30 to the shaft. When it is desired to turn the handle 20 backward to secure an operative connection with the shaft with the handle in a more favorable position for actuation, the latter is turned counter-clockwise, teeth 33 riding over the upper surface of cam member 29 until they drop into other recesses. Downward movement of the cam 29 during the backward turning of handle 20 is permitted by the spring 32. When the handle is again turned forwardly, the shaft is likewise turned in the same direction as described above. During the backward rotation of the handle the shaft is prevented from a similar movement by means of ratchet-wheel 15 and its coöperating pawl or dog 16, which may be actuated manually or automatically, as by a spring.

By using the friction means in addition to the coöperating cams for revolving the brake-shaft I may use comparatively small cams and depend largely upon the frictional engagement for the actuation of the braking mechanism.

Minor mechanical changes may be made in this construction without departing from the substance of my invention as defined by the following claims.

This patent is intended to embrace only so much of the disclosure made herein as is covered by the claims.

I claim—

1. In a device of the character described, the combination of a brake-shaft having a friction-surface, a movable brake-handle having an integral coöperating friction-surface, and means to force said friction-surfaces together to secure an operative frictional connection between said handle and shaft as the former is moved, substantially as described.

2. In a device of the character described, the combination of a brake-shaft having a conical friction-surface, a movable brake-handle having a coöperating conical friction-surface, and means to force said friction-surfaces together to secure an operative frictional connection between said handle and shaft as the former is moved, substantially as described.

3. In a device of the character described, the combination of a brake-shaft having a conical friction-surface, a rotatable brake-handle having a coöperating conical friction-surface, and cam means to force said conical surfaces together to secure an operative frictional connection between said handle and shaft as the former is rotated, substantially as described.

4. In a device of the character described, the combination of a brake-shaft having a conical friction-surface, a brake-handle having a coöperating conical friction-surface rotatably mounted on said shaft, and cam means having interlocking teeth adapted to force said friction-surfaces together to secure an operative frictional connection between said handle and shaft as the former is rotated, substantially as described.

5. In a device of the character described, the combination of a brake-shaft having a friction-surface, a rotatable brake-handle having a coöperating friction-surface, a cam keyed to said brake-shaft and slidable thereon, and means actuated by said handle adapted to coöperate with said cam to force said friction-surfaces together in order to secure an operative frictional connection between said handle and shaft as the former is rotated, substantially as described.

6. In a device of the character described, the combination of a brake-shaft having a friction-surface, a brake-handle having a coöperating friction-surface rotatably mounted on said shaft, a spring-pressed cam keyed to said shaft and slidable thereon, and means coöperating with said cam and actuated by said handle to force said friction-surfaces together in order to secure an operative frictional connection between said handle and shaft as the former is rotated, substantially as described.

7. In a device of the character described, the combination of a brake-shaft having a conical friction-surface, a brake-handle having a coöperating conical friction-surface rotatably mounted on said shaft, a spring-pressed cam keyed to said shaft and slidable thereon, and means actuated by said handle adapted to coöperate with said cam to force said conical friction-surfaces together in order to secure an operative frictional connection between said handle and shaft as the former is rotated, substantially as described.

8. In a device of the character described, the combination of a brake-shaft having a conical friction-surface, a brake-handle having a coöperating conical friction-surface rotatably mounted on said brake-shaft, a spring-pressed cam having teeth keyed to said shaft and slidable thereon, teeth on said handle adapted to coöperate with said cam-teeth to force said friction-surfaces together in order to secure an operative frictional connection between said handle and shaft as the former is rotated forwardly, and means to prevent backward movement of said shaft, substantially as described.

9. In a device of the character described, the combination with a brake-shaft and an operating-handle therefor, of frictional and positive driving connections between said handle and shaft, substantially as described.

10. In a device of the character described, the combination with a brake-shaft and an operating-handle therefor, of positive driving connections between said handle and shaft, and frictional driving connections between said handle and shaft rendered active through the actuation of said positive driving connections, substantially as described.

ETHAN I. DODDS.

Witnesses:
WALTER M. FULLER,
FREDERICK C. GOODWIN.